US012803211B2

(12) United States Patent
Tang et al.

(10) Patent No.: US 12,803,211 B2
(45) Date of Patent: Nov. 17, 2026

(54) CONNECTOR AND INSULATED HOUSING

(71) Applicant: Bellwether Electronic (Kunshan) Co., Ltd., Jiangsu (CN)

(72) Inventors: Xiang-Biao Tang, Jiangsu (CN); Li-Yong Bai, Jiangsu (CN); Xin Du, Jiangsu (CN)

(73) Assignee: Bellwether Electronic (Kunshan) Co., Ltd., Jiangsu (CN)

( * ) Notice: Subject to any disclaimer, the term of this patent is extended or adjusted under 35 U.S.C. 154(b) by 380 days.

(21) Appl. No.: 18/744,720

(22) Filed: Jun. 17, 2024

(65) Prior Publication Data

US 2025/0300388 A1 Sep. 25, 2025

(30) Foreign Application Priority Data

Mar. 25, 2024 (CN) ......................... 202410341876.6

(51) Int. Cl.
*H01R 13/426* (2006.01)
*H01R 13/04* (2006.01)
*H01R 13/50* (2006.01)

(52) U.S. Cl.
CPC ........... *H01R 13/426* (2013.01); *H01R 13/04* (2013.01); *H01R 13/50* (2013.01)

(58) Field of Classification Search
CPC ....... H01R 13/426; H01R 13/04; H01R 13/50
See application file for complete search history.

(56) References Cited

U.S. PATENT DOCUMENTS 12,413,028 B2 * 9/2025 Horning ............... H01R 13/504
2023/0114958 A1 * 4/2023 Horning ............... H01R 13/504 439/544
2025/0343384 A1 * 11/2025 Lee ...................... H01R 25/142

FOREIGN PATENT DOCUMENTS

CN 217545118 U 10/2022
CN 115954699 A 4/2023
CN 116131003 A 5/2023
CN 117748244 A 3/2024

* cited by examiner

*Primary Examiner* — Leah Macchiarolo
(74) *Attorney, Agent, or Firm* — CKC & Partners Co., LLC

(57) ABSTRACT

A connector includes a base and a sliding elastic sheet. The base includes a bottom portion, a first extending portion, a second extending portion, and a wing portion. The first extending portion and the second extending portion protrude from the bottom portion. The first extending portion and the second extending portion are arranged in a direction. The wing portion laterally extends from the bottom portion and located between the bottom portion and one of the first extending portion and the second extending portion. The sliding elastic sheet is slidably disposed on the base. The sliding elastic sheet includes at least one engaging portion, and the sliding elastic sheet is engaged with the base by the at least one engaging portion. The sliding elastic sheet moves relative to the base between a first state and a second state different from the first state.

20 Claims, 9 Drawing Sheets

CONNECTOR AND INSULATED HOUSING

CROSS-REFERENCE TO RELATED APPLICATION

This application claims priority to China Application Serial Number 202410341876.6, filed Mar. 25, 2024, which is herein incorporated by reference in its entirety.

BACKGROUND

Field of Invention

The present invention relates to a connector and an insulated housing.

Description of Related Art

Generally, a busbar clip connector of a server not only includes conductive elastic sheets that are in contact with the copper busbar, but also includes contact elastic sheets that are used to contact the chassis to be grounded. The contact elastic sheets are fixed on the base to prevent the contact elastic sheets from detaching from the base during repeated plugging and unplugging operations of the busbar clip connector. In some common designs, the contact elastic sheets are fixed on the base by locking.

However, with repeated plugging and unplugging operations of the busbar clip connector, the contact elastic sheets will gradually loosen from the base, thereby affecting the ability of ground or causing damage. In addition, in order to fix the contact elastic sheets on the base, additional mechanical features must be added to the base for the contact elastic sheets to be fixed. Therefore, the overall volume of the busbar clip connector will increase, thereby reducing the space utilization of the server in the chassis.

Therefore, how to propose a connector and an insulate housing that can solve the aforementioned problems is one of the problems that the industry is currently eager to invest in research and development resources to solve.

SUMMARY

In view of this, one purpose of the present disclosure is to provide a connector and an insulated housing that can solve the aforementioned problems.

In order to achieve the above objective, according to an embodiment of the present disclosure, a connector includes a base and a sliding elastic sheet. The base includes a bottom portion, a first extending portion, a second extending portion, and a wing portion. The first extending portion and the second extending portion protrude from the bottom portion. The first extending portion and the second extending portion are arranged in a direction. The wing portion laterally extends from the bottom portion and located between the bottom portion and one of the first extending portion and the second extending portion. A height of the wing portion is shorter than a quarter of that of the first extending portion and the second extending portion. The sliding elastic sheet is slidably disposed on the base. The sliding elastic sheet includes at least one engaging portion, and the sliding elastic sheet is engaged with the base by the at least one engaging portion. The sliding elastic sheet moves relative to the base between a first state and a second state different from the first state.

In one or more embodiments of the present disclosure, the base includes an extending bump extending along a first direction, a guiding bump extending along a second direction, and a through bump extending along a third direction. The at least one engaging portion includes a first engaging portion engaged with the extending bump, a second engaging portion engaged with the guiding bump, and a third engaging portion engaged with the through bump.

In one or more embodiments of the present disclosure, the extending bump and the guiding bump are disposed on the first extending portion and the second extending portion. The through bump is disposed on the wing portion.

In one or more embodiments of the present disclosure, the base has a groove located on the first extending portion and the second extending portion. The groove further includes a first groove section and a second groove section. The extending bump protrudes outward from the groove and is adjacent to the second groove section.

In one or more embodiments of the present disclosure, the first engaging portion is located in the first groove section, as the sliding elastic sheet is in the first state. The first engaging portion is located in the second groove section and engaged with the extending bump, the second engaging portion is engaged with an end post of the guiding bump, and the third engaging portion is engaged with the through bump, as the sliding elastic sheet is in the second state.

In one or more embodiments of the present disclosure, the sliding elastic sheet further includes a main body, at least one curling portion, and a bending portion. The main body is connected with the at least one engaging portion and covers an outer side surface of the first extending portion and an outer side surface of the second extending portion. The at least one curling portion protrudes upward from the main body. An end of the at least one curling portion is connected to the main body. The other end of the at least one curling portion is a free end. The bending portion is extended from the main body and configured to cover a top surface of the wing portion.

In one or more embodiments of the present disclosure, the main body and the second engaging portion jointly define a guiding slot. The guiding slot matches the guiding bump and slides relative to the guiding bump between the first state and the second state.

In one or more embodiments of the present disclosure, the sliding elastic sheet further includes a floating portion located on an end of the bending portion. The floating portion and the bending portion are located at different horizontal planes.

In one or more embodiments of the present disclosure, the connector further includes a pin disposed in the base and protruding from a surface of the base and configured to provide a connection signal.

In one or more embodiments of the present disclosure, each of the first extending portion and the second extending portion has a first engaging structure and a second engaging structure respectively connected or adjacent to a first side and a second side of each of the first extending portion and the second extending portion that are adjacent to each other.

In one or more embodiments of the present disclosure, the wing portion has a third engaging structure on a side surface.

In one or more embodiments of the present disclosure, the sliding elastic sheet further includes a main body and at least one curling portion. The main body has a first engaging portion and a second engaging portion respectively connected to the first side and the second side that are adjacent to each other and is engaged with the second engaging structure and the first engaging structure. The at least one curling portion protrudes upward from the first side of the main body.

In one or more embodiments of the present disclosure, the sliding elastic sheet further includes a bending portion extended from a third side of the main body and configured to cover the wing portion.

In one or more embodiments of the present disclosure, a third engaging portion extends downward from one side of the bending portion that is opposed to another side connected to the main body and a floating portion is located at an end of the bending portion.

In order to achieve the above objective, according to an embodiment of the present disclosure, an insulated housing includes a bottom portion, a first extending portion, a second extending portion, and a wing portion. The first extending portion protrudes from the bottom portion. The second extending portion protrudes from the bottom portion. The first extending portion and the second extending portion jointly define a slot there between. The wing portion laterally extends from the bottom portion and is located between the bottom portion and one of the first extending portion and the second extending portion. Each of the first extending portion and the second extending portion has a first engaging structure and a second engaging structure, configured to engage with a metallic sheet, respectively at a first side and a second side of each of the first extending portion and the second extending portion that are adjacent to each other. The wing portion has a third engaging structure configured to engage with the metallic sheet.

In one or more embodiments of the present disclosure, the first engaging structure is a bump extending along a first direction, the second engaging structure is a bump extending along a second direction, and the third engaging structure is a bump extending along a third direction.

In one or more embodiments of the present disclosure, the insulated housing further includes grooves located on the first extending portion and the second extending portion. Each of the grooves further includes a first groove section and a second groove section. The first engaging structure protrudes outward from the grooves and adjacent to the second groove section.

In one or more embodiments of the present disclosure, the first extending portion and the second extending portion includes at least one guiding bump, being rod-like, disposed thereon.

In one or more embodiments of the present disclosure, a height of the wing portion is shorter than a quarter of that of the first extending portion and the second extending portion.

In one or more embodiments of the present disclosure, the wing portion surrounds three sides of the first extending portion and the second extending portion.

In summary, in the connector and the insulated housing of the present disclosure, since the sliding elastic sheet has at least one engaging portion engaged with the base, and the base includes a extending bump, a guiding bump and a through bump extending in different directions, so that the sliding elastic sheet can be positioned in different directions as the sliding elastic sheet is engaged with the aforementioned extending bump, guiding bump, and through bump to achieve the effect of the sliding elastic sheet being fixed on the base in the second state. In the connector and the insulated housing of the present disclosure, since the sliding elastic sheet and the base are engaged with each other by the engaging portion without using any locking parts, the base does not need additional mechanical features to be designed and can reduce the overall volume of the connector to achieve the effect of increasing the space utilization of the server in the chassis. In the connector and the insulated housing of the present disclosure, since the base has a groove corresponding to the first engaging portion of at least one engaging portion, and the groove includes a first groove section and a second groove section, the sliding elastic sheet can move relative to the base by the first engaging portion sliding in the first groove section and the second groove section as the sliding elastic sheet changes from the first state to the second state, and the sliding elastic sheet is fixed to the base as the sliding elastic sheet is in the second state, thereby achieving the purpose of easy installation of the sliding elastic sheet and to improving the effect of fixing.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
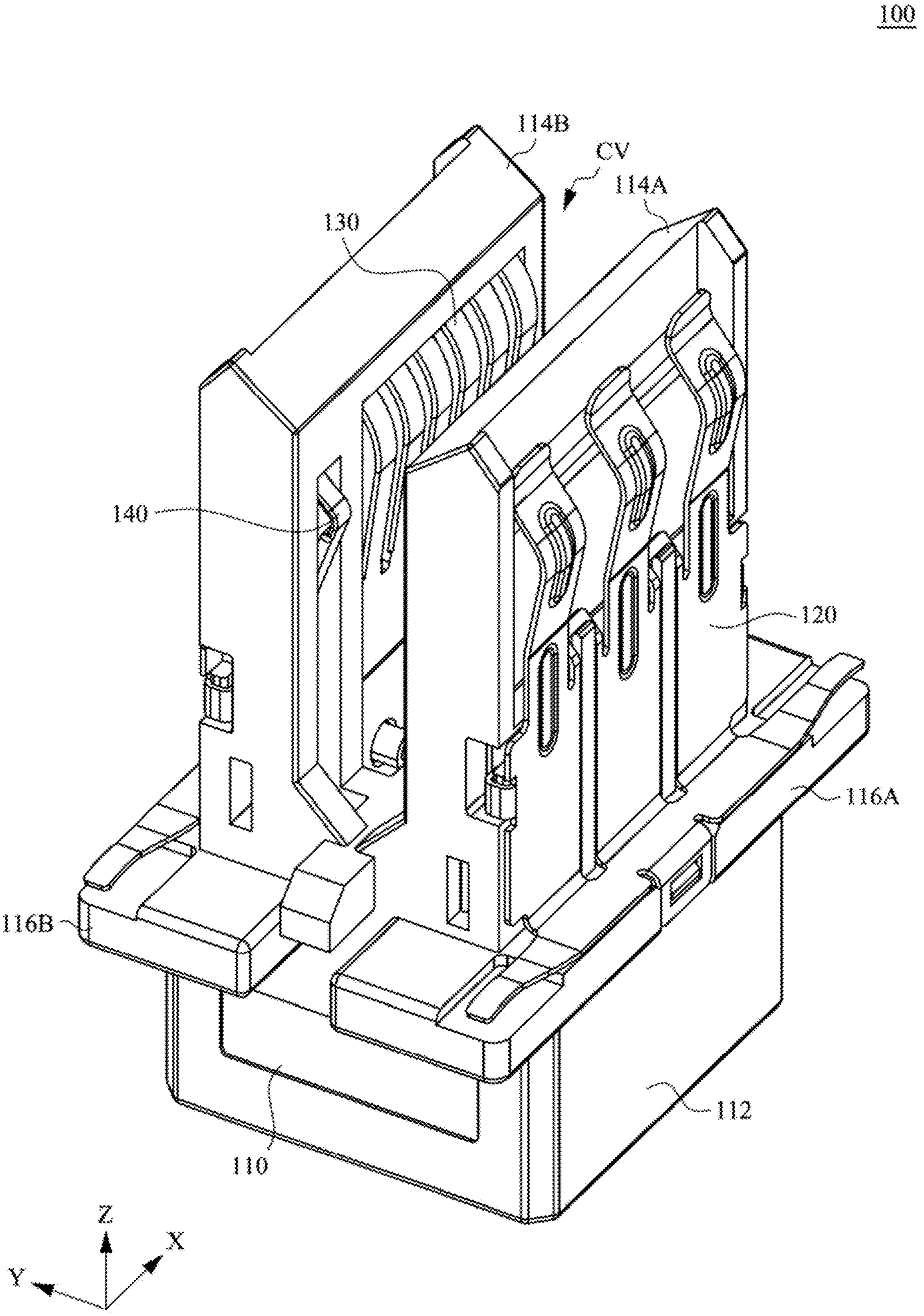
FIG. 1 is a perspective view of a connector in accordance with an embodiment of the present disclosure.

Hereinafter, a plurality of embodiments of the present disclosure will be disclosed in diagrams. For the sake of clarity, many details in practice will be described in the following description. However, it should be understood that these details in practice should not limit present disclosure. In other words, in some embodiments of present disclosure, these details in practice are unnecessary. In addition, for simplicity of the drawings, some conventionally used structures and elements will be shown in a simple schematic manner in the drawings. The same reference numbers are used in the drawings and the description to refer to the same or like parts.

Hereinafter, the structure and function of each component included in a connector 100 of this embodiment and the connection relationship between the components will be described in detail.

Reference is made to FIG. 1. FIG. 1 is a perspective view of a connector 100 in accordance with an embodiment of the present disclosure. As shown in FIG. 1, in this embodiment, the connector 100 is configured to electrically connect to a copper busbar (not shown) in a chassis. The connector 100 includes a base 110, a sliding elastic sheet 120, a conductive elastic sheet 130, and a pin 140. The base 110 functions as an insulated housing of the connector 100. The sliding elastic sheet 120 is slidably disposed on the base 110 and configured to be fixed on the base 110 and connected to ground of the chassis as the connector 100 is electrically connected to the copper busbar in the chassis. The conductive elastic sheet 130 is disposed in the base 110 and configured to contact the copper busbar (not shown) in the chassis. The pin 140 are disposed in the base 110 and configured to contact the copper busbar (not shown) in the chassis and provide a connection signal to determine whether an operating system supported by the connector 100 is ready to operate. As shown in FIG. 1, in some embodiments, the pin 140 protrudes from a surface of the base 110.

As shown in FIG. 1, the base 110 includes a bottom portion 112, a first extending portion 114A, a second extending portion 114B, a wing portion 116A, and a wing portion 116B. The first extending portion 114A and the second extending portion 114B protrude from the bottom portion 112. For example, the first extending portion 114A and the second extending portion 114B protrude from the bottom portion 112 along a direction (e.g., z-direction). In some embodiments, the first extending portion 114A and the second extending portion 114B are arranged in a direction (e.g., y-direction). The wing portion 116A and the wing portion 116B laterally extend from the bottom portion 112 and is perpendicular to the first extending portion 114A and the second extending portion 114B. The wing portion 116A and the wing portion 116B may surround three sides of the bottom portion 112. The wing portion 116A and the wing portion 116B are respectively located between the first extending portion 114A and the bottom portion 112 and between the second extending portion 114B and the bottom portion 112. An extending height of the wing portion 116A and the wing portion 116B from the bottom portion 112 is shorter than a quarter of an extending height of the first extending portion 114A and the second extending portion 114B from the bottom portion 112. In other words, a distance from the farthest end of the wing portion 116A and the wing portion 116B to the bottom portion 112 is smaller than a quarter of a distance of the farthest end of the first extending portion 114A and the second extending portion 114B to the bottom portion 112. The bottom portion 112, the first extending portion 114A, and the second extending portion 114B jointly define a cavity CV. The cavity CV has a slot between the first extending portion 114A and the second extending portion 114B is configured to allow the copper busbar (not shown) in the chassis to insert therein, so that the conductive elastic sheet 130 and the pin 140 can contact the copper busbar in the slot. In some embodiments, a portion of the conductive elastic sheet 130 and a portion of the pin 140 protrude from the surface of the base 110 toward the cavity CV.

Figure 2:
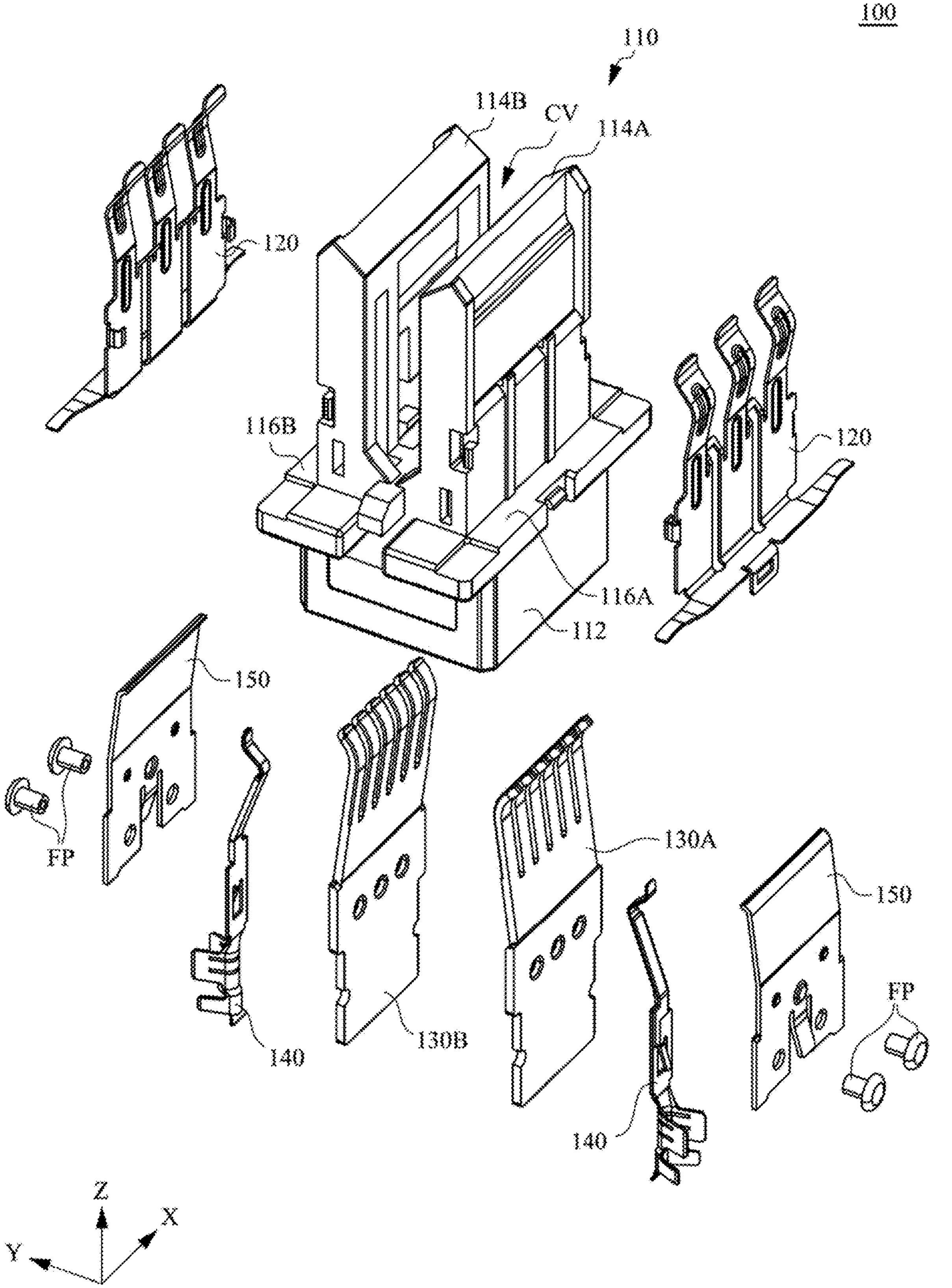
FIG. 2 is an exploded view of the connector in accordance with an embodiment of the present disclosure.

FIG. 2 is an exploded view of the connector 100 in accordance with an embodiment of the present disclosure. As shown in FIG. 2, in this embodiment, the connector 100 further includes a first conductive elastic sheet 130A, a second conductive elastic sheet 130B, one or more supporting parts 150, and a fixing part FP. Specifically, the conductive elastic sheet 130 is substantially divided into a first conductive elastic sheet 130A and a second conductive elastic sheet 130B. The second conductive elastic sheet 130B is separated and electrically isolated from the first conductive elastic sheet 130A. The electric potential of the first conductive elastic sheet 130A is different from the electric potential of the second conductive elastic sheet 130B. In some embodiments, one of the first conductive elastic sheet 130A and the second conductive elastic sheet 130B is connected to the positive line (not shown), and the other one of the first conductive elastic sheet 130A and the second conductive elastic sheet 130B is connected to the negative line (not shown). The one or more supporting parts 150 are disposed in the base 110. For example, the first conductive elastic sheet 130A is located on the first extending portion 114A, and the second conductive elastic sheet 130B is located on the second extending portion 114B. The one or more supporting parts 150 are configured to abut against the first conductive elastic sheet 130A and the second conductive elastic sheet 130B. Specifically, a supporting part 150 is arranged outside the second conductive elastic sheet 130B, and the other supporting part 150 is arranged outside the first conductive elastic sheet 130A. The first conductive elastic sheet 130A and the second conductive elastic sheet 130B are arranged opposite to each other. The fixing part FP is configured to fix the first conductive elastic sheet 130A and the supporting part 150, and the second conductive elastic sheet 130B and the other supporting part 150 respectively.

In some embodiments, the base 110 may be, for example, an insulator or other suitable material. The present disclosure is not intended to limit the material of the base 110.

In some embodiments, the sliding elastic sheet 120 may be, for example, a metallic material, an alloy material, or other suitable materials. The present disclosure is not intended to limit the material of the sliding elastic sheet 120.

In some embodiments, the first conductive elastic sheet 130A and the second conductive elastic sheet 130B may be, for example, brass or other suitable conductive materials. The present disclosure is not intended to limit the material of the first conductive elastic sheet 130A and the second conductive elastic sheet 130B.

In some embodiments, the supporting part 150 may be, for example, stainless steel or other suitable rigid material. In some embodiments in which the material of the first conductive elastic sheet 130A and the second conductive elastic sheet 130B is brass, the supporting part 150 may be made of a material that is more rigid than brass (for example, stainless steel) to provide sufficient support to the first conductive elastic sheet 130A and the second conductive elastic sheet 130B during repeatedly performing pulling and insertion operation of the connector 100, so that the first conductive elastic sheet 130A and the second conductive elastic sheet 130B are not easily deformed, thereby avoiding the problem of poor contact.

Figure 3:
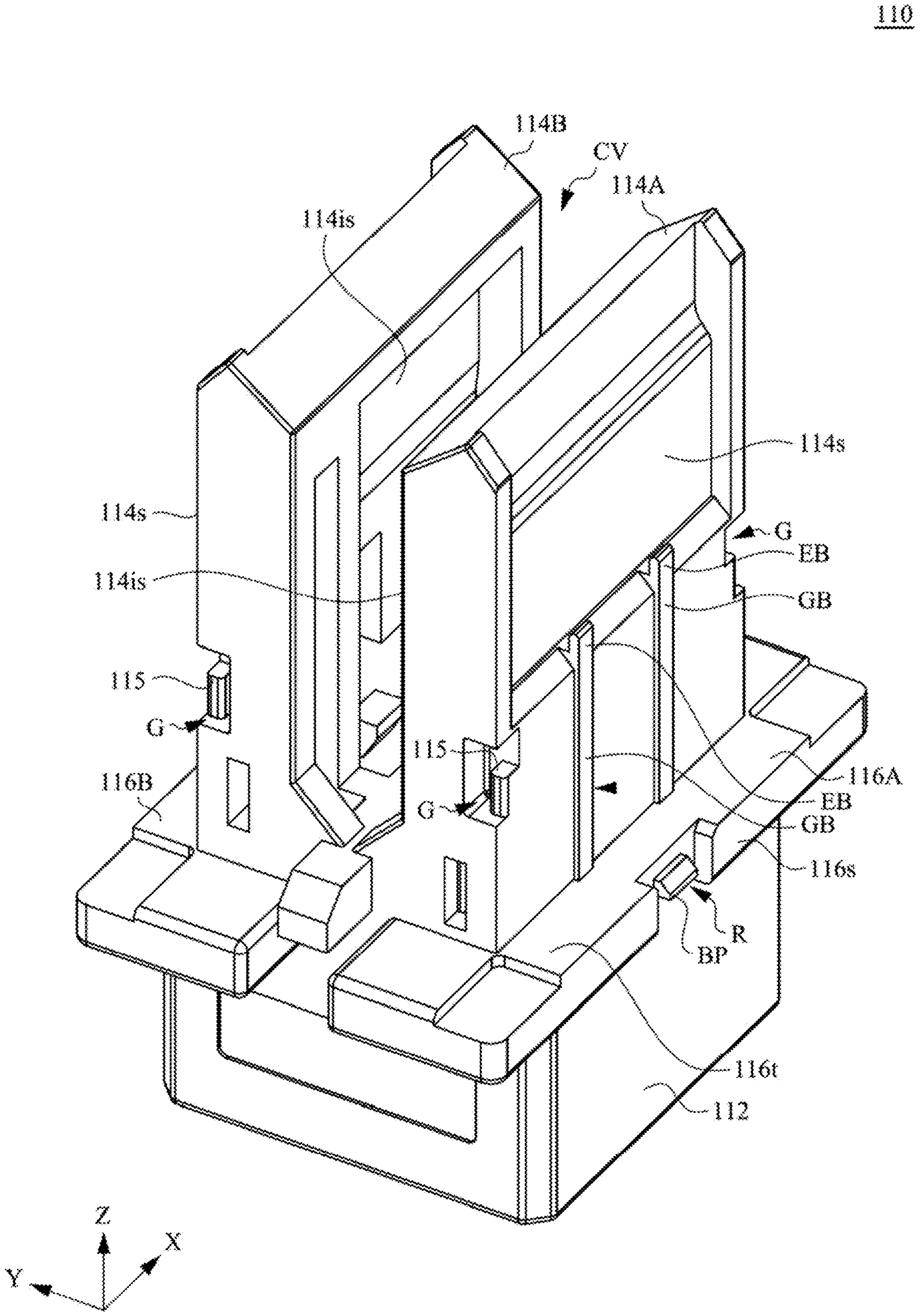
FIG. 3 is a perspective view of a base in accordance with an embodiment of the present disclosure.

FIG. 3 is a perspective view of a base 110 in accordance with an embodiment of the present disclosure. As shown in FIG. 3, in this embodiment, the base 110 further includes extending bumps 115, guiding bumps GB, and through bumps BP. The extending bumps 115, the guiding bump GB, and the through bump BP are configured to engage with the sliding elastic sheet 120. The extending bumps 115 are disposed on the first extending portion 114A and the second extending portion 114B of the base 110. The guiding bumps GB are rod-like and disposed on the first extending portion 114A and the second extending portion 114B of the base 110. The through bumps BP are disposed on the wing portion 116A and the wing portion 116B. In some embodiments, the extending bumps 115 extend along a first direction (e.g., x-direction). The guiding bumps GB are elongated along a second direction (e.g., z-direction) that is different from the first direction and are bar-shaped. The through bumps BP protrude outward from the wing portion 116A or the wing portion 116B along a third direction (e.g., y-direction) that is different from the first direction and the second direction.

The guiding bumps GB, the extending bumps 115, and the through bumps BP function as a first engaging structure, a second engaging structure and a third engaging structure. In some embodiments, the first engaging structure, the second engaging structure and the third engaging structure may be a bump, an arm, a hole, a recess, a slot, or other suitable engaging structure, which are capable of engaging with the second engaging portion 125B, the first engaging portion 125A, and the third engaging portion 125C.

As shown in FIG. 3, the base 110 further has grooves G located on the first extending portion 114A and the second extending portion 114B. The grooves G may be disposed on both sides of the first extending portion 114A and the second extending portion 114B, or the grooves G may be disposed on only one side of the first extending portion 114A and one side of the second extending portion 114B. The extending bumps 115 correspondingly protrude outward from the grooves G. Each of the first extending portion 114A and the second extending portion 114B has an outer side surface 114*s* and an inner side surface 114*is*. As shown in FIG. 3, the guiding bumps GB protrude from the outer side surface 114*s* of the first extending portion 114A and the second extending portion 114B. Each of the guiding bumps GB may include an end post EB. The end post EB of the guiding bump GB is configured to engage with the sliding elastic sheet 120. A portion of the cavity CV is defined by at least the inner side surface 114*is* of the first extending portion 114A and the inner side surface 114*is* of the second extending portion 114B. Each of the wing portion 116A and the wing portion 116B has side surfaces 116*s* and a top surface 116*t*. In some embodiments, an end of the guiding bump GB connects the top surface 116*t* of the wing portion 116A and the wing portion 116B.

As shown in FIG. 3, in some embodiments, the base 110 further has recesses R located on the wing portion 116A and the wing portion 116B. In some embodiments, the recesses R are formed by being recessed from the side surfaces 116*s* of the wing portion 116A and the wing portion 116B. In some embodiments, the through bumps BP protrude outward from the recesses R. In some embodiments, each of the wing portion 116A and the wing portion 116B has only one through bumps BP.

As shown in FIG. 3, in some embodiments, the extending bump 115 is coplanar with the outer side surface 114*s* of the first extending portion 114A or the outer side surface 114*s* of the second extending portion 114B.

As shown in FIG. 3, in some embodiments, the end post EB of the guiding bump GB is separated from the outer side surface 114*s* of the first extending portion 114A or the second extending portion 114B. In some embodiments, the end post EB (first bump) is connected or adjacent to a first side of the first extending portion 114A or the second extending portion 114B, and the extending bump (second bump) 115 is connected or adjacent to a second side of the first extending portion 114A or the second extending portion 114B. Wherein, the second side is adjacent to the first side.

Figure 4:
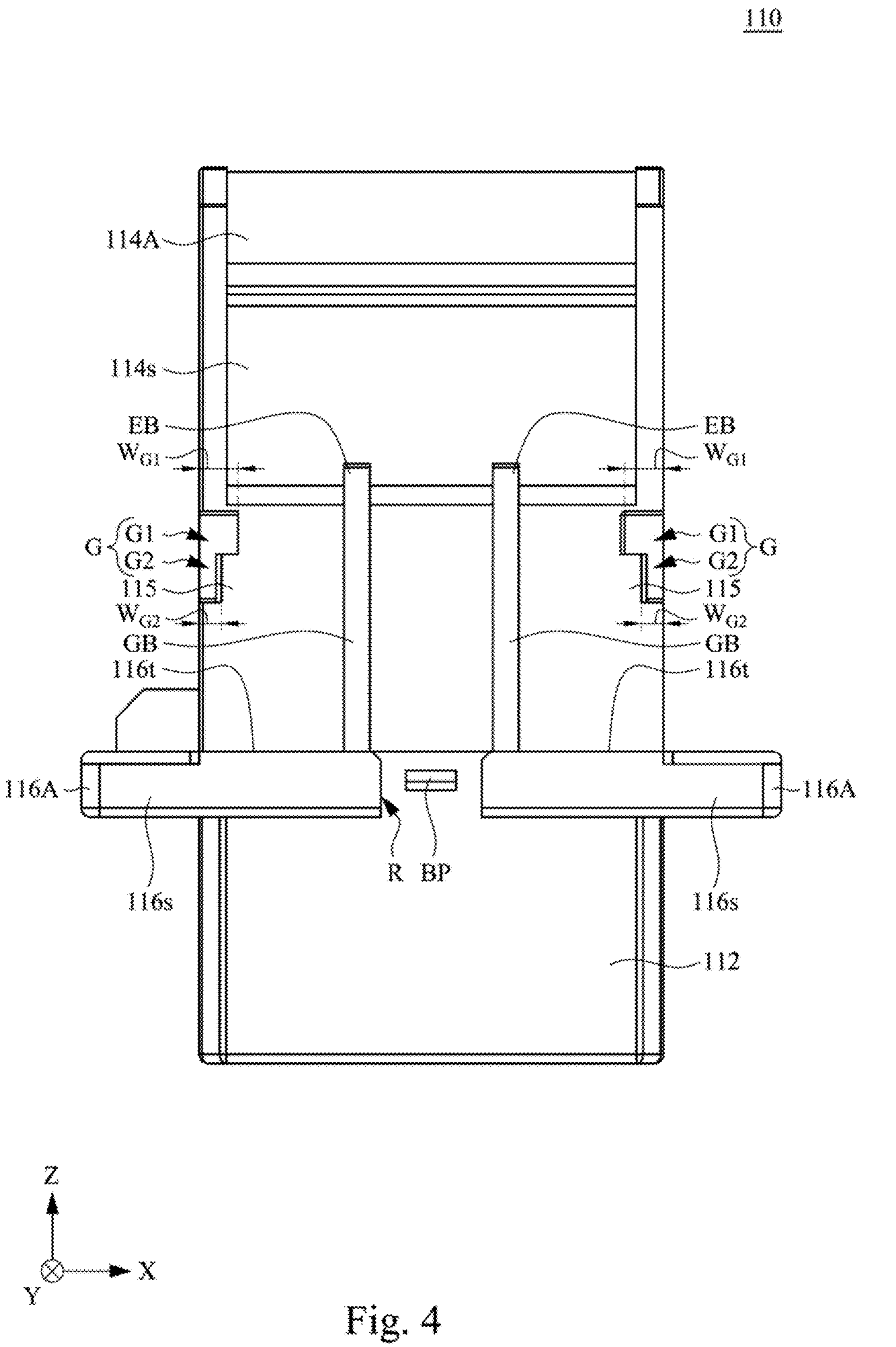
FIG. 4 is a sided view of the base in accordance with an embodiment of the present disclosure.

FIG. 4 is a sided view of the base 110 in accordance with an embodiment of the present disclosure. In this embodiment, the grooves G is L-shaped (in the X-Y plane) and further include a first groove section G1 and a second groove section G2. Specifically, the first groove section G1 is substantially an upper portion of the groove G, and the second groove section G2 is substantially a lower portion of the groove G. The difference between the second groove section G2 and the first groove section G1 is that the extending bump 115 is adjacent to the second groove section G2. In a view of FIG. 4 (that is, viewed from the y-direction penetrating inward the paper), the first groove section G1 has a width WG1 extending in the first direction (e.g., x-direction). The groove section G2 surrounds the extending bump 115 and has a width WG2 extending in the first direction (e.g., x-direction) on the extending bump 115 and the same width WG1 extending in the first direction (e.g., x-direction) behind the extending bump 115. In some embodiments, the width WG1 of the first groove section G1 extending along the first direction is greater than the width WG2 of the second groove section G2 extending along the first direction.

Figure 5A:
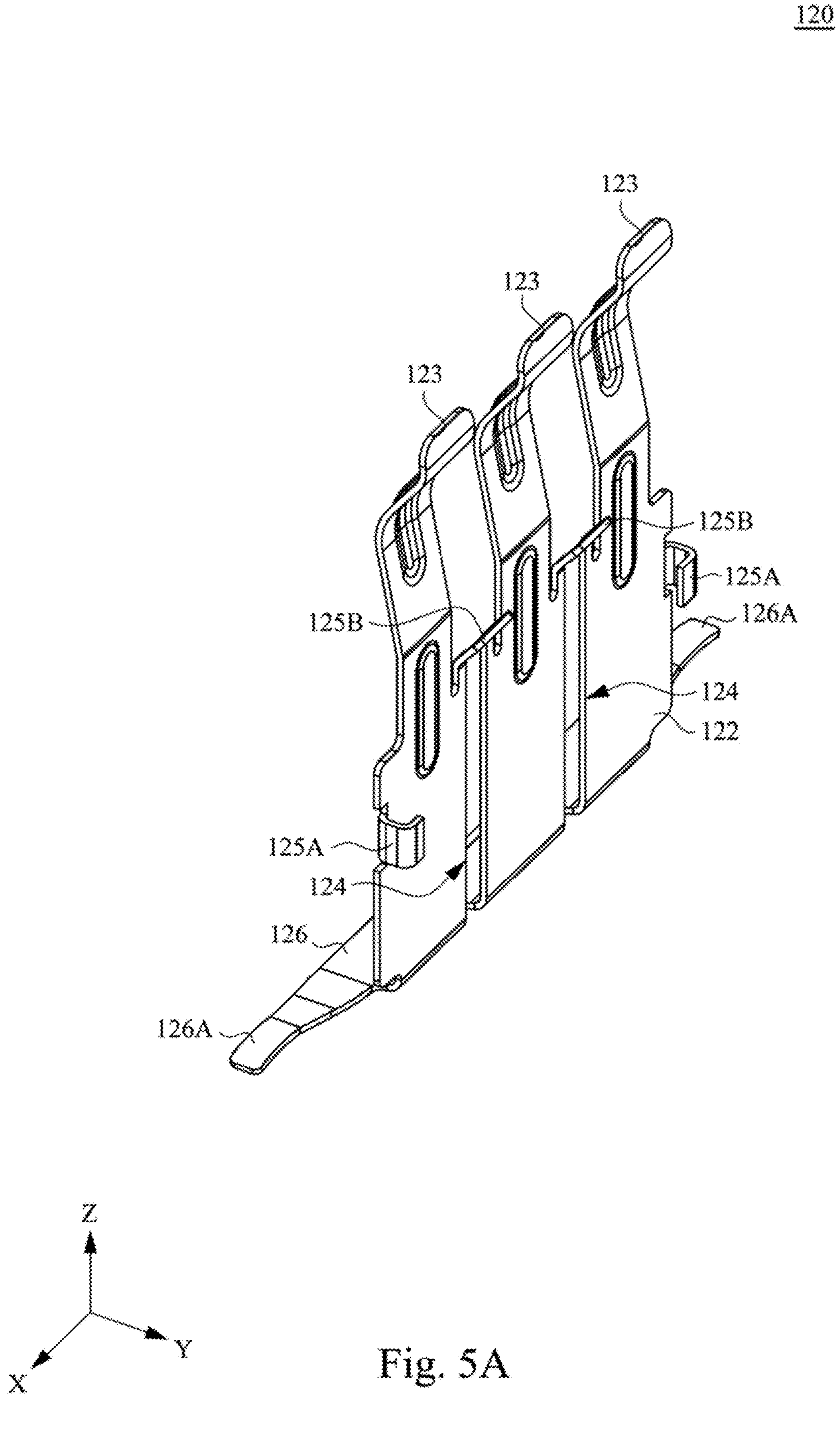
FIG. 5A is a perspective view of a sliding elastic sheet in accordance with an embodiment of the present disclosure.
Figure 5B:
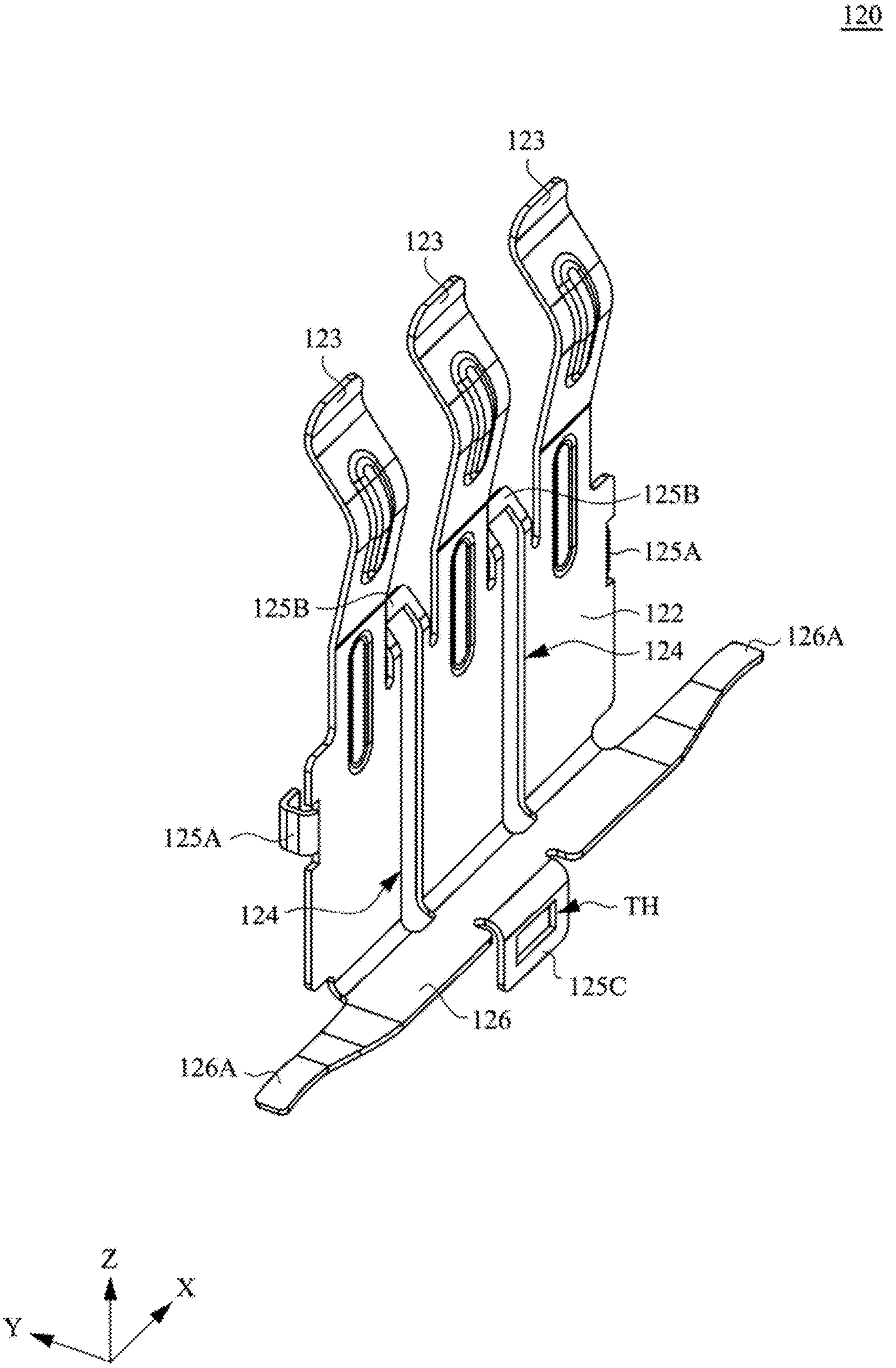
FIG. 5B is another perspective view of a sliding elastic sheet in accordance with an embodiment of the present disclosure.

FIG. 5A and FIG. 5B are perspective views of a sliding elastic sheet 120 in accordance with an embodiment of the present disclosure. As shown in FIG. 5A and FIG. 5B, the sliding elastic sheet 120 includes a main body 122, at least one curling portion 123, a guiding slot 124, a first engaging portion 125A, a second engaging portion 125B, a third engaging portion 125C, and a bending portion 126. The main body 122 covers the outer side surface 114*s* of the first extending portion 114A and the outer side surface 114*s* of the second extending portion 114B. The main body 122 may have at least one concave to abut against the outer side surface 114*s* of the first extending portion 114A and the outer side surface 114*s* of the second extending portion 114B. The main body 122 is connected to the first engaging portion 125A, the second engaging portion 125B, and the third engaging portion 125C. The curling portion 123 extends from a first side of the main body 122 and is wavy. The curling portion 123 may have a convex for contacting the chassis to be grounded. In this embodiment, the curling portion 123 extends upward from the main body 122, and there are three curling portions 123. However, the present disclosure is not intended to limit the quantity of the curling portion 123. An end of the curling portion 123 is connected to the main body 122. The other end of the curling portion 123 is a free end. This ensures that the curling portion 123 can surely contact the chassis to be grounded as the connector 100 is inserted into the chassis (not shown). The guiding slot 124 is disposed on the main body 122. The guiding slot 124 is located adjacent to one of curling portions 123, or between adjacent curling portions 123. The guiding slot 124 matches the guiding bump GB and slides relative to the guiding bump GB. The second engaging portion 125B at the first side of the main body 122 and includes one end of the slot 124 and is inwardly bent, so that the second engaging portion 125B is not at the same plane of the main body 122. The sliding elastic sheet 120 is engaged with the base 110 by the first engaging portion 125A, the second engaging portion 125B, and the third engaging portion 125C. The first engaging portion 125A is at a second side of the main body 122 and is configured to engage with the extending bump 115 of the base 110 for avoiding the main body 122 to unsuitably separate from the outer side surface 114*s* of the first extending portion 114A or the second extending portion 114B. The first side of the main body 122 is adjacent to the second side of the main body 122. The second engaging portion 125B is configured to engage with the guiding bump GB of the base 110 for avoiding the main body 122 and the curling portions 123 to unsuitably separate from the outer side surface 114*s* of the first extending portion 114A or the second extending portion 114B. The third engaging portion 125C extends downward from one side of the bending portion 126 that is opposed to another side connected to the main body 122. The third engaging portion 125C is configured to engage with the through bump BP of the base 110. Specifically, the third engaging portion 125C has a through hole TH, and the through bump BP is configured to pass through the through hole TH of the third engaging portion 125C for fixing the sliding elastic sheet 120 on the base 110. The bending portion 126 extends from a third side of the main body and is substantially perpendicular there to. In some embodiments, the bending portion 126 is a strip and has two long sides, one being connected to the main body 122 and the other being connected to the third engaging portion 125C. The third side of the main body 122 is adjacent to the second side of the main body 122. The bending portion 126 is configured to cover the wing portion 116A and the wing portion 116B. In some embodiments, the bending portion 126 is configured to abut against the top surface 116*t* of the wing portion 116A and the wing portion 116B.

In some embodiments, the first engaging portion 125A, the second engaging portion 125B, and the third engaging portion 125C may be, for example, a buckle, a hook, a U-shaped arm, a through hole, a recess, a slot, a bump or other suitable engaging structure, or any combination of the above. As shown in FIG. 5A and FIG. 5B, for example, the first engaging portion 125A may be in the form of the U-shaped arm to engage with the extending bump 115 of the base 110. The second engaging portion 125B may be in the form of a buckle (for example, a latch) to engage with the end post EB of the guiding bump GB of the base 110. Specifically, the guiding slot 124 may be guided by the guiding bump GB of the base 110 and can slide relative to the guiding bump GB. The second engaging portion 125B is engaged between the end post EB of the guiding bump GB and the outer side surface 114*s* of the first extending portion 114A or the second extending portion 114B. The third engaging portion 125C may be in the form of a buckle to engage with the through bump BP of the base 110.

As shown in FIG. 5A and FIG. 5B, in some embodiments, the sliding elastic sheet 120 further includes a floating portion 126A. The floating portion 126A is configured to abut against the chassis for position identification.

Figure 6:
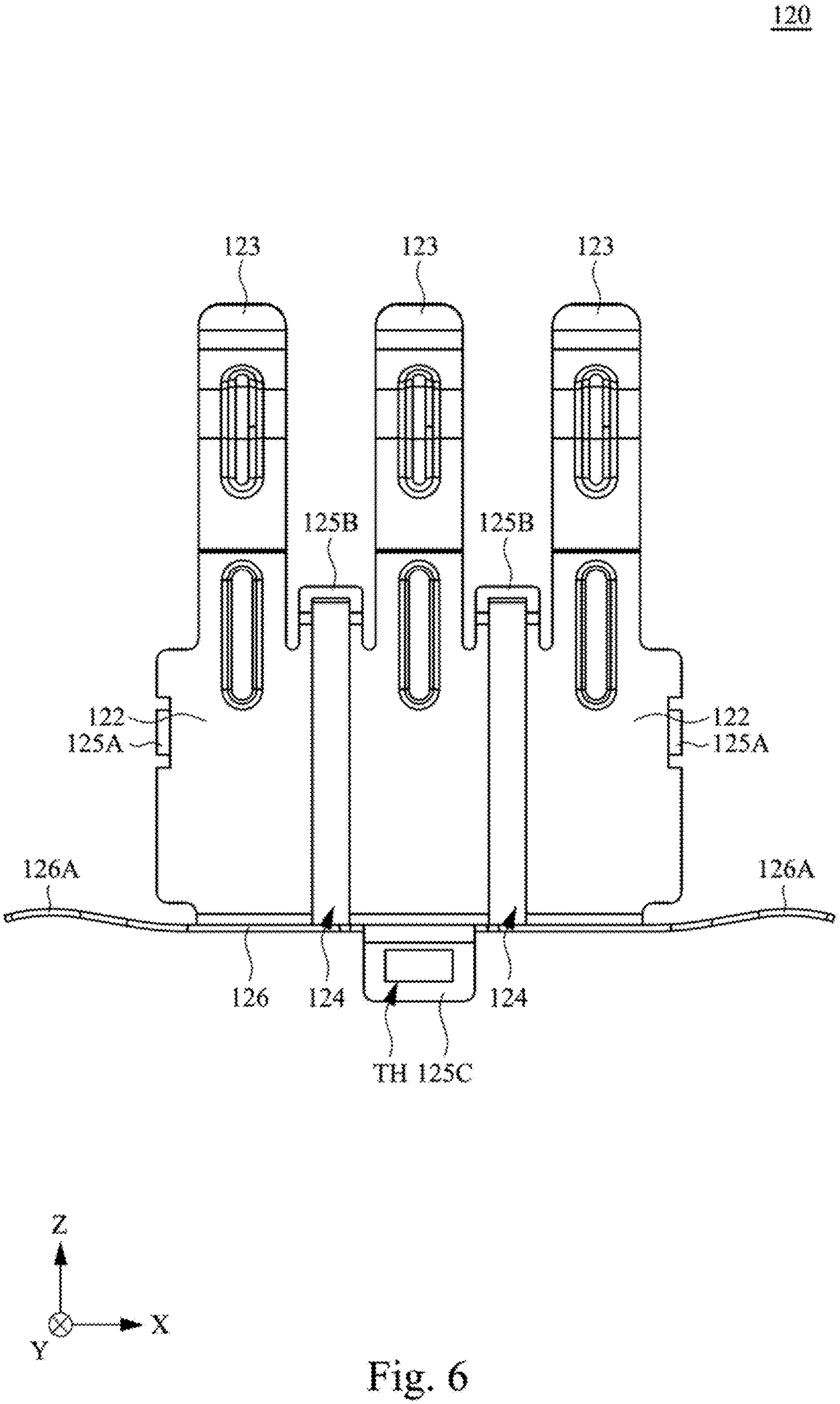
FIG. 6 is a sided view of the sliding elastic sheet in accordance with an embodiment of the present disclosure.

FIG. 6 is a sided view of the sliding elastic sheet 120 in accordance with an embodiment of the present disclosure. In this embodiment, the main body 122 and the second engaging portion 125B jointly define the guiding slot 124. The floating portion 126A is located at an end of the bending portion 126 and has a bulge toward the positive Z axle corresponding a sunk surface of the top surface 116*t* of the wing portion 116A, and the wing portion 116B. In some embodiments, the sliding elastic sheet 120 includes two floating portions 126A located at both ends of the bending portion 126. In some embodiments, the floating portion 126A and the bending portion 126 are located on different horizontal planes.

Figure 7:
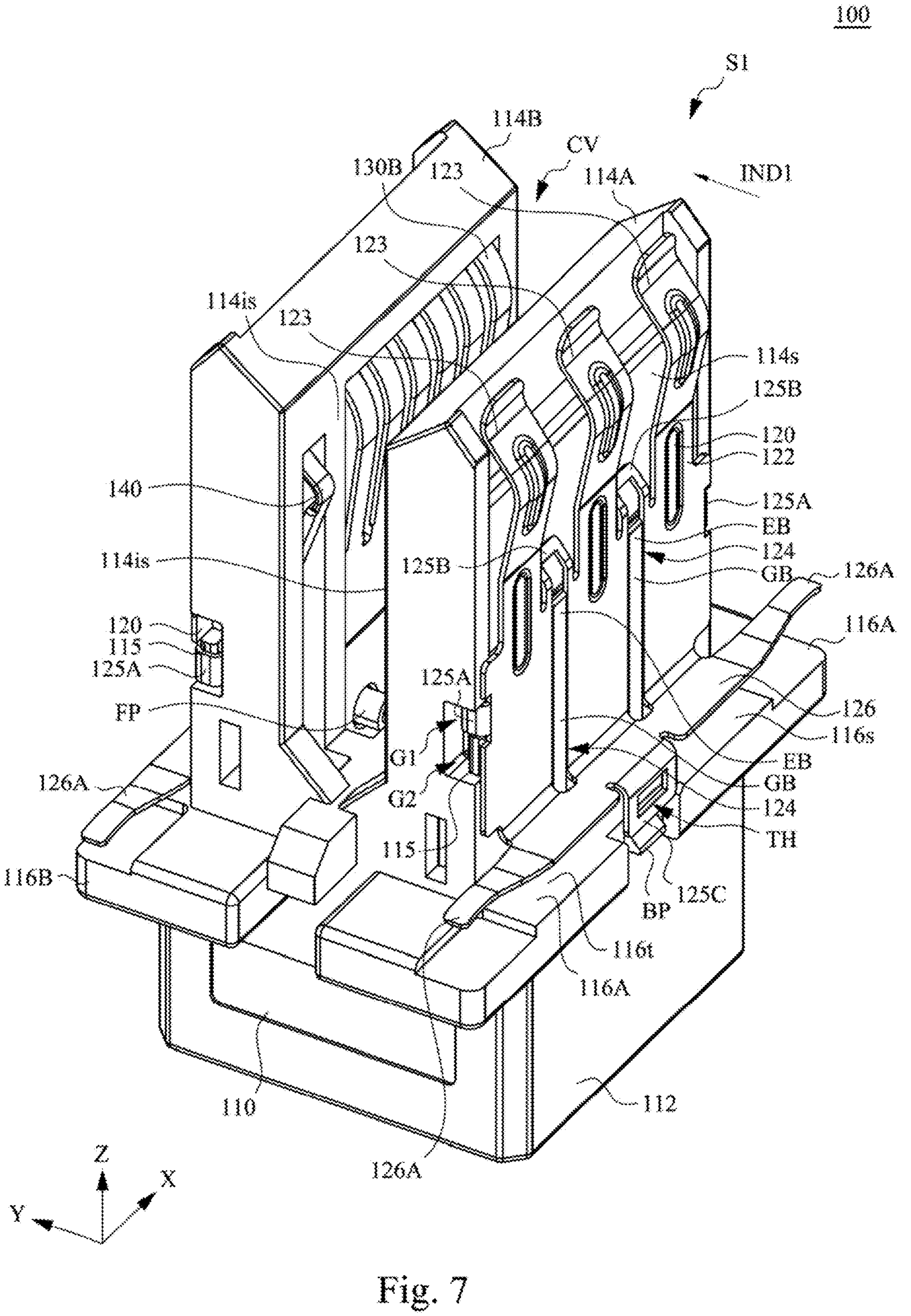
FIG. 7 is a perspective view of the connector in a first state in accordance with an embodiment of the present disclosure.

FIG. 7 is a perspective view of the connector 100 in a first state S1 in accordance with an embodiment of the present disclosure. In this embodiment, the sliding elastic sheet 120 has a first state S1 and a second state S2 that is different from the first state S1. The sliding elastic sheet 120 moves relative to the base 110 between the first state S1 and the second state S2. Details about the second state S2 will be explained below with reference to FIG. 8. As shown in FIG. 7, when the sliding elastic sheet 120 is in the first state S1, the first engaging portion 125A is located in the first groove section G1 of the groove G. The main body 122 covers the outer side surface 114*s* of the first extending portion 114A. The guiding bump GB passes through the guiding slot 124, but the second engaging portion 125B is not engaged with the guiding bump GB. The third engaging portion 125C is not engaged with the through bump BP, either. In other words, when the sliding elastic sheet 120 is in the first state S1, the through bump BP does not pass through the through hole TH of the third engaging portion 125C. Moreover, the bending portion 126 does not abut against the top surface 116*t* of the wing portion 116A.

Figure 8:
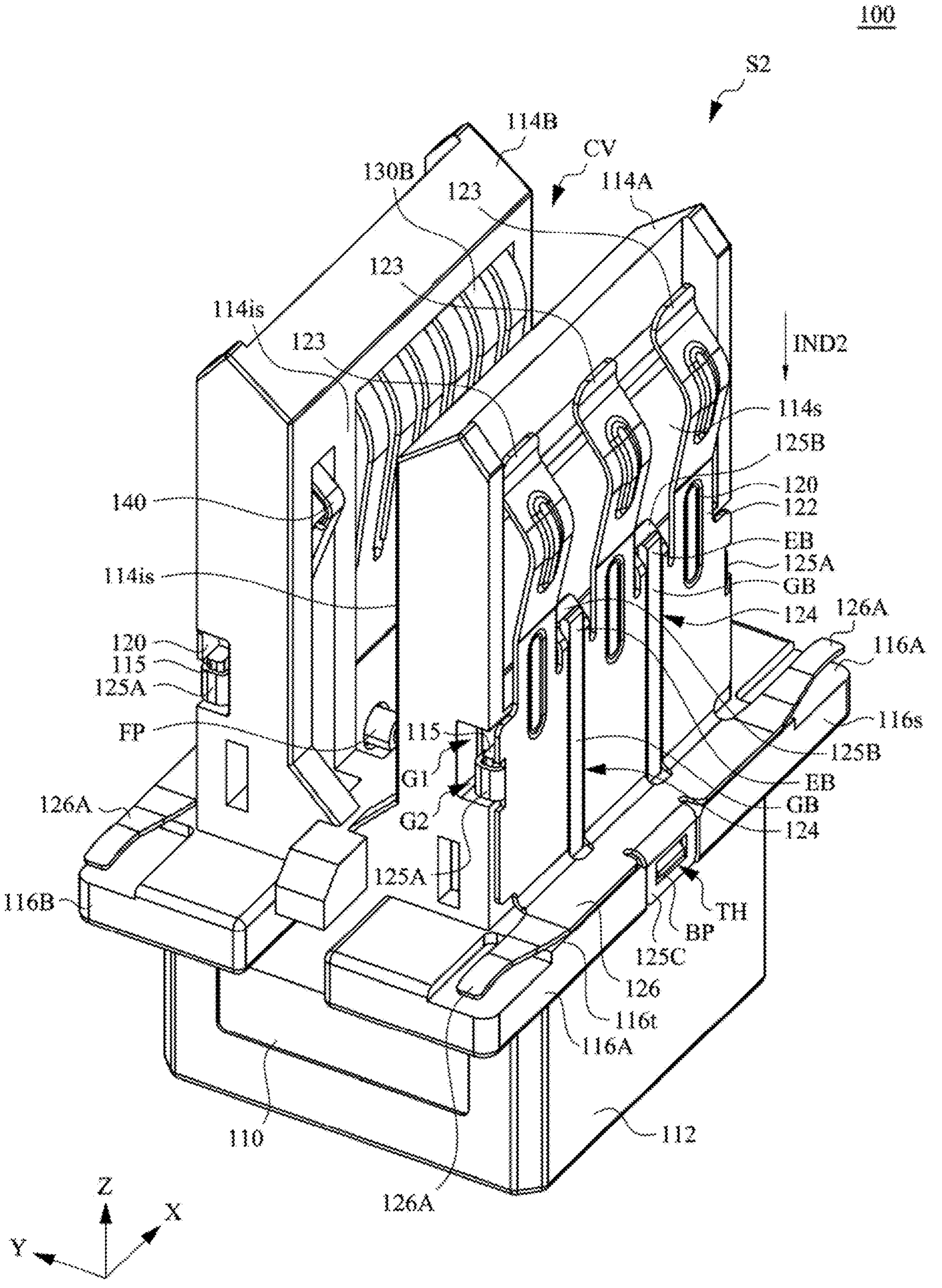
FIG. 8 is a perspective view of the connector in a second state in accordance with an embodiment of the present disclosure.

FIG. 8 is a perspective view of the connector 100 in a second state S2 in accordance with an embodiment of the present disclosure. When the sliding elastic sheet 120 is in the second state S2, the sliding elastic sheet 120 is engaged with the base 110 and fixed on the base 110. In this embodiment, when the sliding elastic sheet 120 is in the second state S2, the first engaging portion 125A is located in the second groove section G2 of the groove G and engaged with the extending bump 115. Specifically, the first engaging portion 125A with a U-shaped arm structure surrounds the extending bump 115 on three sides. In this embodiment, two first engaging portions 125A located on both sides of the main body 122 tightly bind the extending bump 115. The main body 122 covers the outer side surface 114*s* of the first extending portion 114A. The guiding bump GB passes through the guiding slot 124, and the second engaging portion 125B is engaged with the end post EB of the guiding bump GB. The third engaging portion 125C is also engaged with the through bump BP. In other words, when the sliding elastic sheet 120 is in the second state S2, the through bump BP passes through the through hole TH of the third engaging portion 125C. Moreover, the bending portion 126 abuts against the top surface 116*t* of the wing portion 116A. When the sliding elastic sheet 120 is in the second state S2, even though the curling portion 123 inherits the pressure toward the first extending portion 114A, the sliding elastic sheet 120 is firmly engaged with the base 110 by the buckling of the first engaging portion 125A, the second engaging portion 125B, and the third engaging portion 125C in different directions and forms, and the sliding elastic sheet 120 will not fall off from the base 110.

Reference is made again to FIG. 7 and FIG. 8. In a usage scenario, as shown in FIG. 7, a user can hold the sliding elastic sheet 120 and tightly press toward the outer side surface 114*s* of the first extending portion 114A along an installation direction IND1 firstly, so that the first engaging portion 125A enters the groove G via the first groove section G1 without being interfered by the extending bump 115. Then, as shown in FIG. 7 and FIG. 8, the user can continue to hold the sliding elastic sheet 120 and move it downward along an installation direction IND2 toward the bottom portion 112 of the base 110. Accordingly, the sliding elastic sheet 120 changes from the first state S1 to the second state S2. Specifically, when the sliding elastic sheet 120 changes from the first state S1 to the second state S2, the guiding bump GB of the base 110 guides the guiding slot 124 of the sliding elastic sheet 120, so that the sliding elastic sheet 120 moves relative to the base 110 along the installation direction IND2. In addition, the first engaging portion 125A moves from the first groove section G1 to the second groove section G2, the second engaging portion 125B enters between the end post EB of the guiding bump GB and the outer side surface 114*s*, and the third engaging portion 125C allows the through hole TH to be passed through by the through bump BP by the elastic restoring force of the third engaging portion 125C. By the aforementioned structural configuration, the user can install the sliding elastic sheet 120 on the base 110 in a simpler way, and achieve a purpose of fixing the sliding elastic sheet 120 on the base 110 at the same time. Furthermore, the first engaging portion 125A and the second engaging portion 125B further achieve a purpose of ensuring the at least one curling portion 123 close enough to the first extending portion 114A and the second extending portion 114B and avoiding the at least one curling portion 123 to be collapsed as contacting the chassis. In addition, the user does not need to utilize additional fasteners to fix the sliding elastic sheet 120 to the base 110, but can use the first engaging portion 125A, the second engaging portion 125B, and the third engaging portion 125C of the sliding elastic sheet 120 to achieve a purpose of fixing. On the one hand, it can achieve the effect of saving materials. On the other hand, it can also reduce the volume occupied by the wing portion 116A and the wing portion 116B.

From the above detailed description of the specific embodiments of the present disclosure, it can be clearly seen that in the connector and the insulated housing of the present disclosure, since the sliding elastic sheet has at least one engaging portion engaged with the base, and the base includes a extending bump, a guiding bump and a through bump extending in different directions, so that the sliding elastic sheet can be positioned in different directions as the sliding elastic sheet is engaged with the aforementioned extending bump, guiding bump, and through bump to achieve the effect of the sliding elastic sheet being fixed on the base in the second state. In the connector and the insulated housing of the present disclosure, since the sliding elastic sheet and the base are engaged with each other by the engaging portion without using any locking parts, the base does not need additional mechanical features to be designed and can reduce the overall volume of the connector to achieve the effect of increasing the space utilization of the server in the chassis. In the connector and the insulated housing of the present disclosure, since the base has a groove corresponding to the first engaging portion of at least one engaging portion, and the groove includes a first groove section and a second groove section, the sliding elastic sheet can move relative to the base by the first engaging portion sliding in the first groove section and the second groove section as the sliding elastic sheet changes from the first state to the second state, and the sliding elastic sheet is fixed to the base as the sliding elastic sheet is in the second state, thereby achieving the purpose of easy installation of the sliding elastic sheet and to improving the effect of fixing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A connector, comprising:

a base comprising a bottom portion, a first extending portion, a second extending portion, and a wing portion, the first extending portion and the second extending portion protruding from the bottom portion, the first extending portion and the second extending portion being arranged in a direction, and the wing portion laterally extending from the bottom portion and being located between the bottom portion and one of the first extending portion and the second extending portion, wherein a height of the wing portion is shorter than one quarter of each respective height of the first extending portion and the second extending portion; and a sliding elastic sheet slidably disposed on the base, the sliding elastic sheet comprising at least one engaging portion, and the sliding elastic sheet being engaged with the base by the at least one engaging portion, wherein the sliding elastic sheet moves relative to the base between a first state and a second state different from the first state.

2. The connector of claim 1, wherein the base comprises an extending bump extending along a first direction, a guiding bump extending along a second direction, and a through bump extending along a third direction, and the at least one engaging portion comprises a first engaging portion engaged with the extending bump, a second engaging portion engaged with the guiding bump, and a third engaging portion engaged with the through bump.

3. The connector of claim 2, wherein the extending bump and the guiding bump are disposed on the first extending portion and the second extending portion, and the through bump is disposed on the wing portion.

4. The connector of claim 2, wherein the base has a groove located on the first extending portion and the second extending portion, the groove further comprises a first groove section and a second groove section, and the extending bump protrudes outward from the groove and is adjacent to the second groove section.

5. The connector of claim 4, wherein:

the first engaging portion is located in the first groove section, as the sliding elastic sheet is in the first state, and the first engaging portion is located in the second groove section and engaged with the extending bump, the second engaging portion is engaged with an end post of the guiding bump, and the third engaging portion is engaged with the through bump, as the sliding elastic sheet is in the second state.

6. The connector of claim 2, wherein the sliding elastic sheet further comprises:

a main body connected with the at least one engaging portion and covering an outer side surface of the first extending portion and an outer side surface of the second extending portion;

at least one curling portion protruding upward from the main body, an end of the at least one curling portion being connected to the main body, and the other end of the at least one curling portion being a free end; and a bending portion extended from the main body and configured to cover a top surface of the wing portion.

7. The connector of claim 6, wherein the main body and the second engaging portion jointly define a guiding slot, and the guiding slot matches the guiding bump and slides relative to the guiding bump between the first state and the second state.

8. The connector of claim 6, wherein the sliding elastic sheet further comprises a floating portion located on an end of the bending portion, and the floating portion and the bending portion are located at different horizontal planes.

9. The connector of claim 1, further comprising a pin disposed in the base and protruding from a surface of the base and configured to provide a connection signal.

10. The connector of claim 1, wherein the first extending portion and the second extending portion are adjacent to each other, wherein each of the first extending portion and the second extending portion has a first engaging structure and a second engaging structure, wherein the first engaging structure and second engaging structure are disposed on opposite sides of the first extending portion and the second extending portion.

11. The connector of claim 10, wherein the wing portion has a third engaging structure on a side surface.

12. The connector of claim 10, wherein the sliding elastic sheet further comprises:

a main body having a first engaging portion and a second engaging portion respectively connected to the first side and the second side that are adjacent to each other and engaged with the second engaging structure and the first engaging structure; and at least one curling portion protruding upward from the first side of the main body.

13. The connector of claim 12, wherein the sliding elastic sheet further comprises a bending portion extended from a third side of the main body and configured to cover the wing portion.

14. The connector of claim 13, wherein a third engaging portion extends downward from one side of the bending portion that is opposed to another side connected to the main body and a floating portion is located at an end of the bending portion.

15. An insulated housing of a connector, comprising:

a bottom portion;

a first extending portion protruding from the bottom portion;

a second extending portion protruding from the bottom portion, and the first extending portion and the second extending portion jointly defining a slot there between; and at least one wing portion laterally extending from the bottom portion and being located between the bottom portion and one of the first extending portion and the second extending portion, wherein each of the first extending portion and the second extending portion has a first engaging structure and a second engaging structure, configured to engage with a metallic sheet, respectively at a first side and a second side of each of the first extending portion and the second extending portion that are adjacent to each other, and wherein the wing portion has a third engaging structure configured to engage with the metallic sheet.

16. The insulated housing of claim 15, wherein the first engaging structure is a bump extending along a first direction, the second engaging structure is a bump extending along a second direction, and the third engaging structure is a bump extending along a third direction.

17. The insulated housing of claim 16, further comprising grooves located on the first extending portion and the second extending portion.

18. The insulated housing of claim 17, wherein the first extending portion and the second extending portion comprise at least one guiding bump, being rod-like, disposed thereon.

19. The insulated housing of claim 15, wherein a height of the at least one wing portion is shorter than one quarter of the respective height of the first extending portion or the second extending portion.

20. The insulated housing of claim 19, wherein the at least one wing portion surrounds three sides of the first extending portion or the second extending portion.

* * * * *